United States Patent [19]
Colonna et al.

[11] Patent Number: 6,115,620
[45] Date of Patent: Sep. 5, 2000

[54] MODE-SWITCHABLE PORTABLE COMMUNICATION DEVICE AND METHOD THEREFOR

[75] Inventors: Frank C. Colonna, Schaumburg; Michael L. Charlier, Palatine; Rachid Alameh, Schaumburg; Thomas J. Walczak; Thomas Gitzinger, both of Woodstock; Michael W. Schellinger, Arlington Heights; Christopher S. Gremo, Crystal Lake, all of Ill.

[73] Assignee: Motorola, Inc., Schaumburg, Ill.

[21] Appl. No.: 09/081,843

[22] Filed: May 20, 1998

[51] Int. Cl.[7] .............................. A04M 1/00; A04B 1/38
[52] U.S. Cl. .................... 455/569; 455/550; 455/575; 455/90; 379/420; 379/433
[58] Field of Search .................... 455/569, 550, 455/575, 90; 379/388, 420, 424, 432, 433

[56] References Cited

U.S. PATENT DOCUMENTS

| | | |
|---|---|---|
| 4,845,772 | 7/1989 | Metroka et al. ........................ 455/574 |
| 5,175,759 | 12/1992 | Metroka et al. . |
| 5,276,916 | 1/1994 | Pawlish et al. ......................... 455/575 |
| 5,465,401 | 11/1995 | Thompson . |
| 5,610,971 | 3/1997 | Vandivier ................................ 455/569 |
| 5,715,524 | 2/1998 | Jambhekar et al. ...................... 455/90 |
| 5,828,965 | 10/1998 | Brown et al. . |
| 5,901,223 | 5/1999 | Wicks et al. ............................ 379/433 |

OTHER PUBLICATIONS

Northern Telecom, Wireless Terminals, PCS '97, Sep. 10–12, 1997, Dallas, TX.

International Application Number: PCT/US93/11291, International Publication Number: WO 94/13088, "Housing Assembly For A Wireless Communication Device", Nov. 22, 1993, Motorola, Inc., Kevin Kaschke, 41 pages.

*Primary Examiner*—William G. Trost
*Assistant Examiner*—Erika A. Gary

[57] ABSTRACT

A portable communication device (100) comprises a first housing element (202) and a second housing element (204), wherein the second housing element (204) is movingly connected to the first housing element (202) such that the second housing element (202) is settable to substantially three positions. A sensor (112) coupled to the first housing element (202) and the second housing element (204) produces a position signal to indicate the position of the second housing element (204) relative to the first housing element (202), and an activation element (230) produces an activation signal in response to a user input. A controller (106) operates the portable communication device (100) in one of a standby mode, a private-mode, and a speakerphone mode in response to the position signal and the activation signal.

38 Claims, 7 Drawing Sheets

MODE-SWITCHABLE PORTABLE COMMUNICATION DEVICE AND METHOD THEREFOR

FIELD OF THE INVENTION

This invention relates generally to a portable communication device and more specifically to a portable communication device incorporating position-sensitive switching between a speakerphone mode of operation and a non-speakerphone mode of operation.

BACKGROUND OF THE INVENTION

With the widespread popularity of portable communication devices such as cellular telephones, there has been an increasing demand for such portable communication devices to operate in more than one user mode. In a first mode of operation, here referred to as a normal-phone mode, a user first holds the portable communication device away from his ear and enters access information such as a telephone number. The user inputs can be verified by monitoring the information shown on a display. The user then places the portable communication device close to his ear to engage in a call.

The first mode of operation limits usability; the display cannot be seen and the user cannot input information while the portable communication device is next to the user's ear. In addition, it is sometimes desirable for the user to not have to hold the portable communication device while engaged in a call. The user may thus want to place the portable communication device down while still maintaining communication. For these reasons, a second mode of operation, a hands-free or speakerphone mode, is employed.

In the speaker phone mode, the portable communication device will emit audio information at a louder volume, thus allowing the user to hear information while the portable communication device is away from his ear. If, however, the portable communication device is in the speakerphone mode while it is next to the user's ear, damage to the user's hearing system could result. Therefore, mode switching reliability between normal-phone mode and speakerphone mode is important to ensure that the portable communication device does not inadvertently switch to the speakerphone mode while it is close to the user's ear.

One method to prevent the portable communication device from operating in speakerphone mode while it is close to a user's ear is through the use of a proximity detection system. The proximity detection system senses when the user's head is close to the portable communication device and causes the normal phone mode to be initiated. However, use of a conventional proximity detection system must contain sophisticated reliability circuitry in order for the system to be fail-safe.

Accordingly, there is a need for a highly reliable apparatus and method to switch between private-mode and speakerphone mode in a portable communication device. The result would be a portable communication device that could safely be switched between the private-mode and speakerphone mode, thus allowing greater use and functionality of the portable communication device.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, and wherein:

DETAILED DESCRIPTION OF A PREFERRED EMBODIMENT

A portable communication device comprises a first housing element and a second housing element, wherein the second housing element is movingly connected to the first housing element such that the second housing element is settable to substantially three positions. A sensor coupled to the first housing element and the second housing element produces a position signal to indicate the position of the second housing element relative to the first housing element, and an activation element disposed on one of the first housing element and the second housing element produces an activation signal in response to a user input. A controller operates the portable communication device in one of a private-mode, a speakerphone mode, and a standby mode in response to the position signal and the activation signal.

Figure 1:
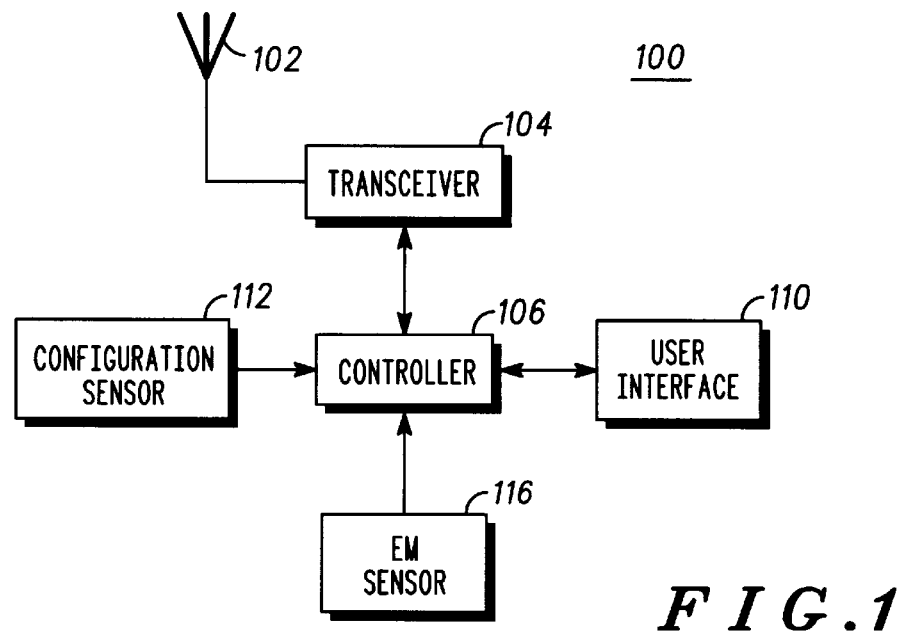
FIG. 1 is an illustration in block diagram form of a portable communication device capable of mode-switching in accordance with the present invention.

FIG. 1 is an illustration in block diagram form of a portable communication device, here referred to as radiotelephone 100, that is capable of mode-switching. The radiotelephone 100 provides two-way voice communication and can also include data transfer functions such as internet connectivity, email, and FAX capability. In the illustrated embodiment, the radiotelephone 100 comprises a radiotelephone; other electronic devices, such as personal organizers, personal digital assistants, and input devices to interactive television can also employ the invention.

To transmit RF signals containing transmit data (such as voice, digital information, or control signals) from the radiotelephone 100, a user interface 110 directs user input data to a controller 106. The controller 106 typically includes a microprocessor, memory, a clock generator, and digital logic. The controller 106 formats the transmit data obtained from the user interface 110 and conveys it to a transmitter within transceiver 104 for conversion into RF modulated signals. The transceiver 104 conveys the RF modulated signals to the antenna 102 for transmission.

The radiotelephone 100 detects RF signals containing receive data through the antenna 102 and produces detected RF signals. A receiver within the transceiver 104, coupled to the antenna 102, converts the detected RF signals into electrical baseband signals, demodulates the electrical baseband signals, recovers the receive data, including automatic frequency control information, and outputs the receive data to the controller 106. The controller 106 formats the data into recognizable voice or data information for use by user interface 110. The user interface 110 communicates the received information or voice to a user. Typically, the user interface 110 includes a microphone, a speaker, a display, a keypad, and special function input elements. The user interface 110 also comprises an activation element, responsive to a user input, for producing an activation signal.

The sensor 112 actively detects the physical configuration of the radiotelephone 100 and sends a position signal to the controller 106. The controller 106 operates the radiotelephone 100 in a private-mode, a speakerphone mode, and a standby mode in response to the position signal and the activation signal. The description and operation of several embodiments of the sensor 112 and the activation element will be described in further detail in conjunction with FIGS. 2 through 12.

In an alternate embodiment, an EM sensor 116 continually scans for the presence of an electromagnetic (EM) field of a predetermined strength. When the EM field is detected, the EM sensor 116 sends an override signal to the controller 106, and the controller 106 will operate the radiotelephone 100 in the speakerphone mode when the controller 106 detects the override signal and the activation signal. For example, a user can place the radiotelephone 100 into a phone receptacle mounted within the interior of an automobile. The phone receptacle comprises a magnet that will emit an EM field of a predetermined strength. When the radiotelephone 100 is placed within, or attached to, the phone holder, the EM sensor 116 produces the override signal. The controller 106 then operates the radiotelephone 100 in the speakerphone mode when the controller has sensed the activation signal and the radiotelephone 100 is in either the speakerphone configuration or the private-mode configuration. In the illustrated embodiment, the EM sensor 116 comprises a reed switch coupled to circuitry disposed within the radiotelephone 100.

It will be obvious to those skilled in the art the size of magnet necessary in order to produce an EM field of a pre-determined strength sufficient for detection by the EM sensor 116. For example, the EM field strength depends upon the sensitivity of the Reed switch used as the EM sensor 116. In illustrated embodiment, the predetermined EM field strength is sufficient to produce at least 130 Gauss at the Reed switch.

Figure 2:
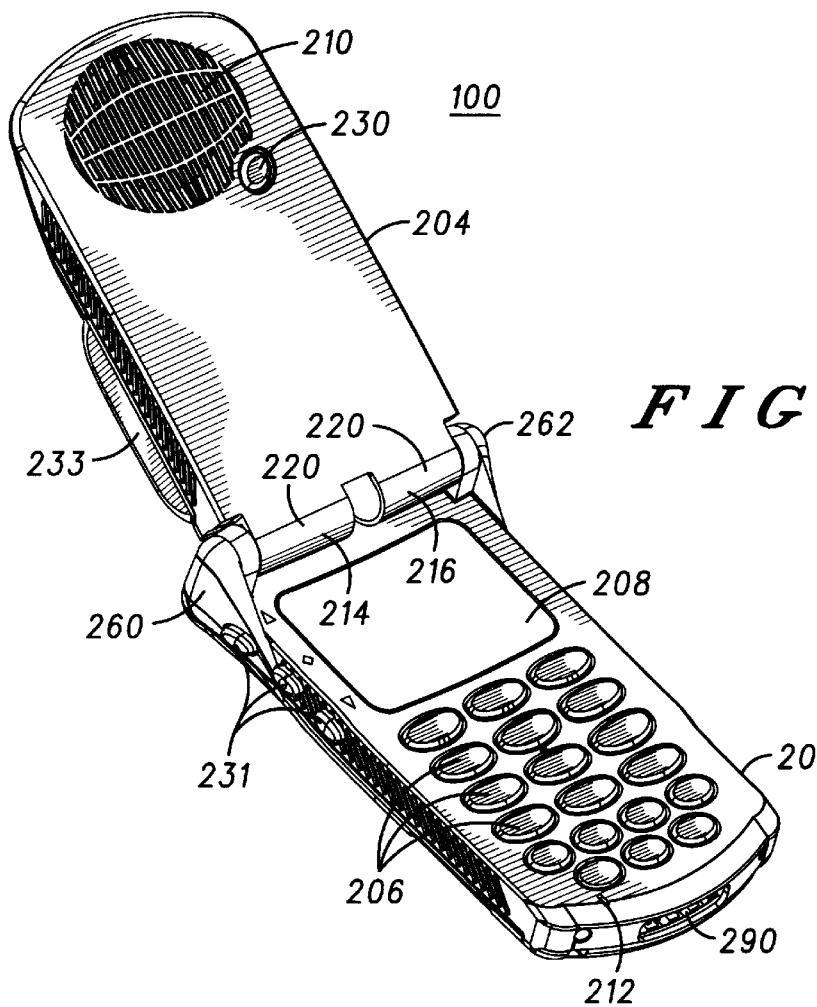
FIG. 2 is an outer view of a portable communication device in a private-mode configuration in accordance with the present invention.

FIG. 2 is an outer view of the radiotelephone 100 in the private-mode (normal mode) configuration. The radiotelephone 100 comprises a first housing element 202 and a second housing element 204 that is movable relative to the first housing element 202. In the preferred embodiment, the first housing element 202 and the second housing element 204 are movably connected through a hinge 220, and the second housing element 204 is settable to substantially three positions. The first settable position, shown in FIG. 2, is for operating the radiotelephone 100 in the private-mode, wherein the user places the radiotelephone 100 close to his mouth and ear to engage in a call.

In the illustrated embodiment, the private-mode configuration consists of the second housing element 204 set to an angle of substantially one-hundred-fifty-five degrees relative to the first housing element 202. Alternatively, other angles can be used for the private-mode position. For example, the radiotelephone 100 can be designed to operate in the private-mode when the second housing element 204 is set to a predetermined position within the range of one-hundred-thirty degrees and one-hundred-eighty degrees relative to the first housing element 202.

The hinge 220 comprises substantially two hinge assemblies, shown here as first hinge assembly 214 and second hinge assembly 216. The first hinge assembly 214 is coupled to a first portion 260 of the first housing element 202, and the second hinge assembly 216 is coupled to a second portion 262 of the first housing element 202. The sensor 112 is coupled to the hinge 220 and detects the position of the second housing element 204 relative to the first housing element 202. The sensor is thus coupled to the first housing element 202 and the second housing element 204 and produces the position signal to indicate the relative position of the first housing element 202 and the second housing element 204.

The first housing element 202 carries a display 208 for displaying messages and information, a keypad 206 for entering user input, and a microphone 212. A battery 233 is coupled to the second housing element 204, and an external power supply receptacle 290, disposed on the first housing element 202, is for connection to an external power supply.

The second housing element 202 comprises the activation element 230. In the illustrated embodiment, the activation element 230 comprises a button with an integrated light-emitting-diode (LED). In alternate embodiments, the activation element 230 can be disposed on the second housing element 204. It will be obvious to those skilled in the art that other mechanisms, such as a switch, can be used for the activation element 230. The second housing element 204 carries a speaker 210.

The activation element 230 is for switching operation of the radiotelephone 100 into the speakerphone (hands-free) mode. When the radiotelephone 100 is in the private-mode configuration, however, the activation element normally does not substantially effect the operation of the radiotelephone 100.

Figure 3:
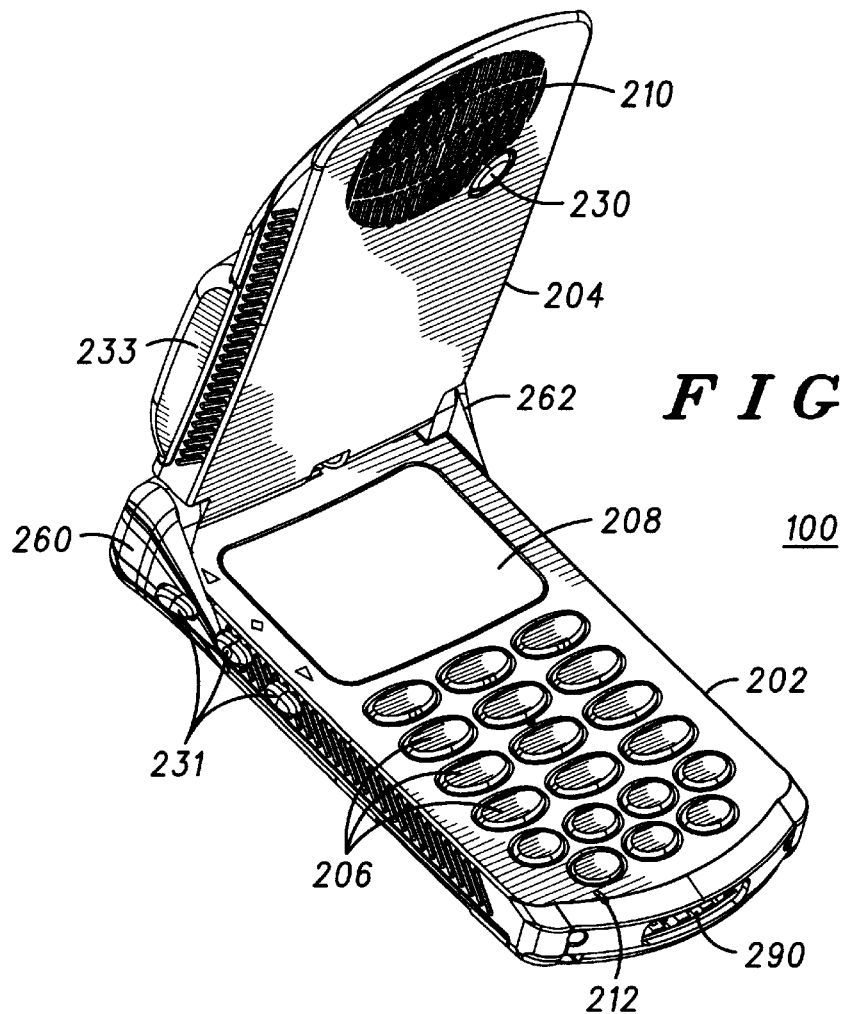
FIG. 3 is an outer view of the portable communication device of FIG. 2 in a speakerphone configuration in accordance with the present invention.

In an alternate embodiment, there is a special condition when the activation element 230 does effect the operation of the radiotelephone 100 even though the radiotelephone 100 is in the private-mode configuration. When the radiotelephone 100 is mounted in a special phone receptacle 3000 (shown in FIG. 12) containing a magnet, the EM sensor 116 detects the EM field emitted by the magnetic. The EM sensor 116 then sends an override signal to the controller 106. If the user then toggles the activation element 230 while the radiotelephone 100 is in the phone receptacle, the controller 106 will operate the radiotelephone 100 in the speakerphone mode. The radiotelephone 100 will continue to operate in the speakerphone mode as long as it remains in the phone receptacle 3000 and the second housing element 204 is in either the first position (FIG. 2) or a second position (FIG. 3).

For example, the phone receptacle 3000 can be for operating the radiotelephone in the speakerphone mode inside of an automobile. The phone receptacle 3000 can be mounted on the interior of the automobile, and the user can then couple the radiotelephone 100 to the phone receptacle 3000 for operation in the speakerphone mode.

In addition, a moving automobile generates low frequency noise within the interior of the automobile. Such noise results from moving automobile components, engine noise, and road surface noise. To overcome this low frequency noise, equalization techniques can be employed to affect the audio response of the radiotelephone 100 speaker when the radiotelephone 100 is operating in the speakerphone mode and the override signal is detected.

Normally, an audio (lowpass) filter coupled to the radiotelephone 100 speaker shapes the audio response of the radiotelephone 100 speaker. When the controller 106 detects the override signal and the activation signal and thus operates the radiotelephone 100 in the speakerphone mode, a capacitor of the audio filter is bypassed such that the gain above 1 KHz increases by substantially 6 dB per octave. This effectively increases the treble response of the radiotelephone 100 speaker. It will be obvious to those skilled in the art that there are many different frequency ranges that can be enhanced to overcome the low frequency noise generated within an automobile.

FIG. 3 is an outer view of the radiotelephone 100 in a speakerphone configuration. When the second housing element 204 is set to the speakerphone position (also referred to as the second position), the user can operate the radiotelephone 100 in the speakerphone mode (also referred to as a hands-free mode) by toggling the activation element 230. For example, when the second housing element 204 is placed in the speakerphone position, the sensor 112 sends the position signal to the controller 106. When the user then initiates the activation element 230, the activation signal is produced and the controller 106 operates radiotelephone 100 in the speakerphone mode. To indicate that the radiotelephone 100 is in the speakerphone mode, the LED within the activation element 230 will turn on (light up). The LED will remain on for as long as the radiotelephone 100 operates in the speakerphone mode.

In the illustrated embodiment, the speakerphone configuration comprises the second housing element 204 set to an angle of substantially ninety degrees relative to the first housing element 202. Alternatively, other angles can be used for the speakerphone position. For example, the radiotelephone 100 can be designed to operate in the speakerphone mode when the second housing element 204 is set to a predetermined position within the range of seventy degrees and one-hundred-ten degrees (such as eighty degrees) relative to the first housing element 202.

In the speakerphone mode, the gain of the audio circuitry driving the speaker 210 is increased by substantially thirty dB (compared to the gain of the audio circuitry when the phone is operating in the private-mode) so that the user can hear the speaker 210 output even though the radiotelephone 100 is not immediately adjacent to the user's ear. When audio signals are not present at the speaker 210, the gain of the circuitry coupled to the microphone 212 is increased by substantially thirteen dB (relative to the private-mode gain setting) in order to increase the sensitivity of the microphone 212. When audio signals are present at the speaker 210, the gain of the circuitry coupled to the microphone 212 is then decreased by substantially thirteen dB in order to reduce speaker-to-microphone feedback.

When the radiotelephone 100 is operating in the speakerphone mode and the user moves the second housing element 204 back to the first position (FIG. 2), the radiotelephone 100 will switch operation to the private-mode. When the operation of the portable communication 100 is changed from speakerphone mode to private-mode, the gain of the circuitry driving the speaker 210 is decreased by substantially thirty dB, and the gain of the circuitry coupled to the microphone is decreased by substantially thirteen dB from its speakerphone gain setting. To switch operation into the speakerphone mode again, the user must set the second housing element 104 to the second position and then toggle the activation element 230.

In an alternate embodiment, there is a special condition when the activation element 230 does effect the operation of the radiotelephone 100 even though the radiotelephone 100 is in the private-mode configuration. When the radiotelephone 100 is mounted in a special phone receptacle 3000 containing a magnet, the EM sensor 116 detects the EM field emitted by the magnetic and then sends an override signal to the controller 106. If the user then toggles the activation element 230 while the radiotelephone 100 is in the phone receptacle 3000 (and in either the speakerphone or private-mode configuration) the controller 106 will operate the radiotelephone 100 in the speakerphone mode. The radiotelephone 100 will continue to operate in the speakerphone mode as long as it remains in the phone receptacle 3000 and the radiotelephone 100 is in either the private-mode configuration or the speakerphone configuration. When the radiotelephone 100 is removed from the phone receptacle 3000, radiotelephone 100 reverts to operation in the private-mode. To switch operation to the speakerphone mode, the user must place the second housing element 204 to the speakerphone position and then toggle the activation element 230.

Figure 4:
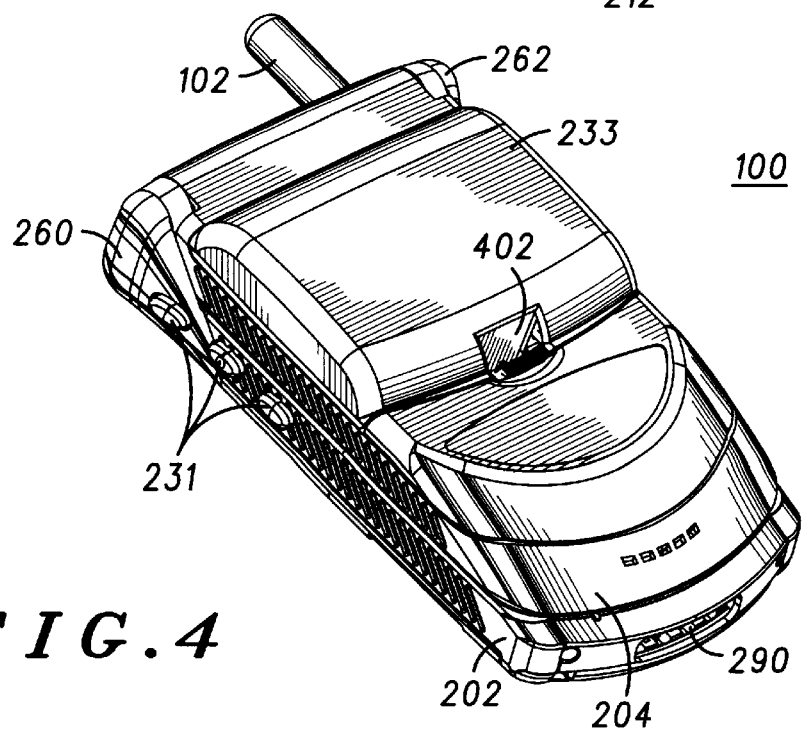
FIG. 4 is an outer view of the portable communication device of FIG. 2 in a standby mode configuration in accordance with the present invention.

FIG. 4 is an outer view of the radiotelephone of FIG. 3 in a standby mode configuration. In the standby mode, the second housing element 204 is set to a third position that is a substantially closed position relative to the first housing element 202. The standby mode typically comprises a mode in which certain circuitry is powered down to save energy, while other circuitry remains active in order to receive incoming calls. The closed configuration also comprises the radiotelephone 100 turned off. A latch 402 is for coupling the battery 233 to the second housing element 204.

Figure 5:
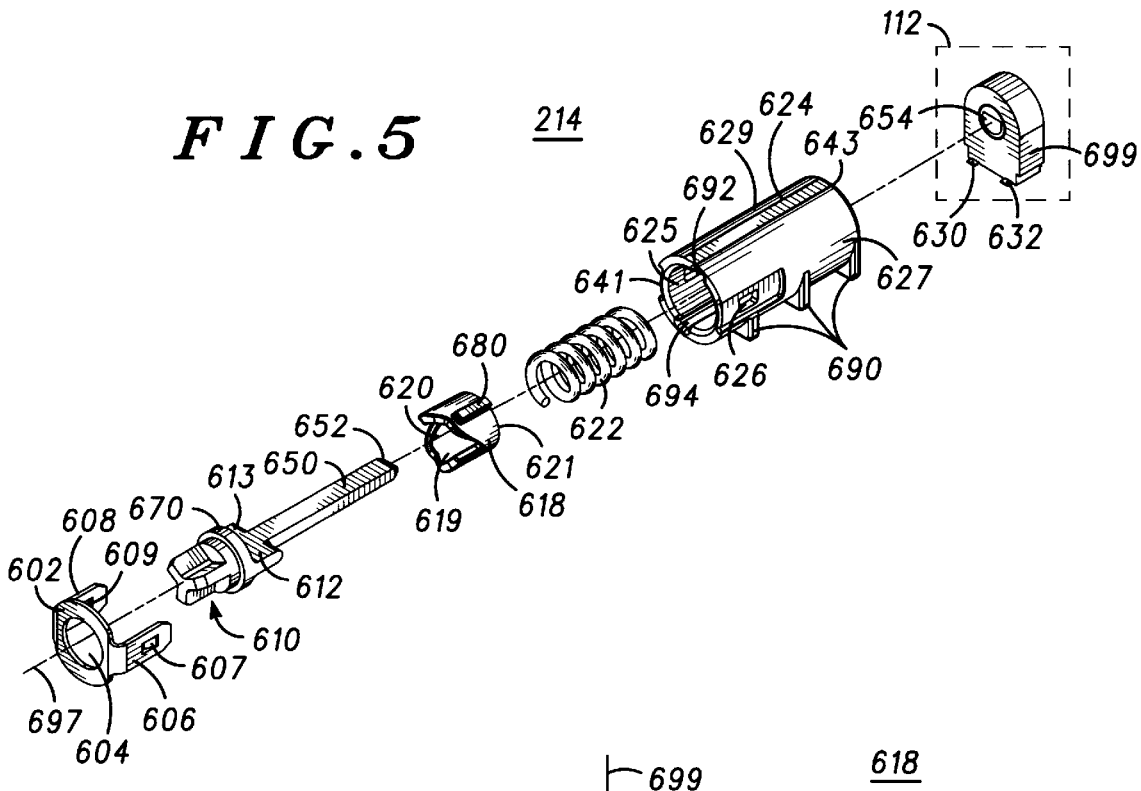
FIG. 5 is an exploded view showing the components of a first hinge assembly of the portable communication device in accordance with the present invention.

FIG. 5 is an exploded view showing the components of the first hinge assembly 214 and the sensor 112. The sensor 112 is shown to comprise a switch 699. The sensor 112 further comprises circuitry coupled to the switch 699 for producing the position signal. The first hinge assembly generally comprises a cap 602, a shaft 650, a cam 618, a spring 622, and an insert can 624.

The cap 602 is formed to have an opening 604 and a first prong 606 and a second prong 608. The first prong 606 is formed to have a first tab 607, and the second prong 608 is formed to have a second tab 609.

The shaft 650 has a first end 610 keyed to couple to the first section 260 of the first housing element 202, and the shaft 650 has a second end 652 that is keyed to couple to a movable portion 654 of the switch 699. In addition, the shaft 650 is formed to have a first cam follower 612 and a second cam follower 613 located opposite the first cam follower 612. The first end 610 is sized to be insertable through the opening 604 such that the cap couples to a circular ring 670 formed on the outer surface of the shaft. By coupling the first end 610 to the first housing element 202, the shaft 650 remains substantially stationary relative to the first housing element 202.

The cam 618 comprises a body that is cylindrical and formed to have a hollow center 619. A first end 620 of the cam is formed to have a surface with detentes (valleys), slopes, and peaks. The hollow center 619 is sized to receive the shaft 650 such that the cam 618 is movably coupled to the shaft 650. The shaft 650 extends through the cam 618 so that the first cam follower 612 and the second cam follower 613 couples to the first end 620 of the cam 618. The spring 622 presses against a second end 621 of the cam 618. The cam 618 also has a first tab 680 located on the outer surface of the cam 618 and a second tab 681 (hidden from view) located on the outer surface opposite the first tab 680.

The insert can 624 is formed to have a hollow center 625 sized to receive the spring 622, the cam 618, and a portion of the shaft 650 extending from the second end 652 to the circular ring 670. The insert can 624 is formed to have a first track 692 located on an inner surface of the hollow center 625, and the first track 692 extends from the first end 641 of the insert can 624 to the second end 643 of the insert can 624. The insert can 624 is also formed to have a second track 694 located on the inner surface of the hollow center 625 that also extends from the first end 641 of the insert can 624 to the second end 643 of the insert can 624. The first track 692 is for coupling to the first tab 680 of the cam 618, and the second track 694 is for coupling to the second tab 681 of the cam 618. The legs 690 of the insert can 624 are for mechanical support.

Coupling the tabs of the cam 618 to the tracks of the insert can 624 causes the cam 618 to be engaged to the insert can 624 so that the cam 618 will not rotate around the axis 697 within the insert can 624. As the second housing section 204 is moved from one direction to another, however, the cam 618 will slide back and forth along the axis 697 within the insert can 624.

The insert can 624 is also formed to have a first opening 626 on a first side 627 of the insert can 624, and a second opening (not shown) located on a second side 629 located opposite the first side 627 of the insert can 624. The cap 602 engages the insert can 624 by coupling the first tab 607 of the cap 602 to the first opening 626 of the insert can 624 and by coupling the second tab 609 of the cap 602 to the second opening located on the second side 629 of the insert can 624. The cap 602 engages the insert can 624 to cause the spring 622, the cam 618, and a portion of the shaft 650 to be enclosed within the hollow center 625 of the insert can 624 to form the first hinge assembly 214.

The cap 602 couples to the insert can 624 so that the spring 622 is partially compressed. The compressed spring 622 provides a force against the second end 621 of the cam 618 so that the first end 620 of the cam 618 is constantly in contact with the first cam follower 612 and the second cam follower 613.

The switch 699 abuts the insert can 624. The movable portion 654 of the switch 699 is formed to receive and engage the keyed second end 652 of the shaft 650. The switch 699 has four electrical contacts 630, 632, and two others hidden from view) that couple to circuitry, preferably disposed on a flexible circuit card, that is disposed within the second housing element 204. In the preferred embodiment the switch 699 comprises a rotary switch.

The first hinge assembly is disposed within the second housing element. When the second housing element 204 is moved relative to the first housing element 202, the insert can 624, the cam 618, the cap 602, and the switch rotate around the axis 697 substantially in unison with the second housing element 204. The shaft 650 remains substantially stationary relative to the first housing element 202. The shaft 650 also remains substantially stationary relative to the switch 699 when the switch 699 rotates around the axis 697. Thus, when the second housing element 204 is moved relative to the first housing element 202, the shaft 650 turns the movable portion 654 of the switch 699 and causes the sensor 112 to detect the position of the second housing element 204 relative to the first housing element 202. The sensor 112 therefore comprises a switch that is selectively activated by interaction with the first hinge assembly 214.

It will be obvious to those skilled in the art that alternate embodiments of the hinge assembly 214 and the sensor 112 can be employed. For example, the sensor 112 can comprise two switches disposed in a single package, with circuitry coupled to the two switches for producing the position signal.

Figure 6:
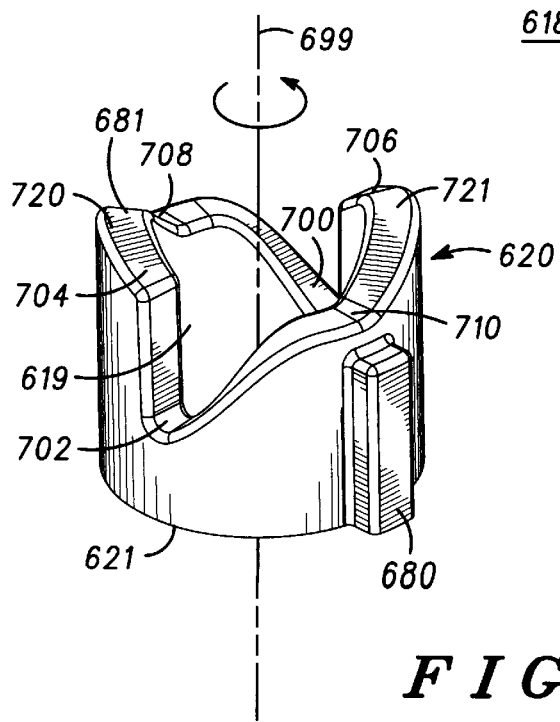
FIG. 6 illustrates a cam used in the hinge assembly of FIG. 5.

FIG. 6 illustrates the cam 618 used in the first hinge assembly 214. The cam 618 comprises a body that is cylindrical and formed to have a hollow center 619. The second end 621 abuts to the spring 622, and the first end 620 of the cam is formed to have a surface with detentes (valleys), slopes, and peaks. The cam 618 also has a first tab 680 located on the outer surface of the cam 618 and a second tab located on the outer surface opposite the first tab 680.

The first cam follower 612 (shown in FIG. 5) and the second cam follower 613 (shown in FIG. 5) follow the detentes, slopes, and peaks of the cam 618. For example, when the radiotelephone 100 is in the closed configuration, the first cam follower 612 rests in a first location 704, and the second cam follower 613 rests in a first location 706. This configuration corresponds to the spring 622 being in its most compressed state.

As the second housing element 204 is opened relative to the first housing element 202, the cam 618 rotates in a counter-clockwise direction around the axis 697 (as indicated by the arrow in FIG. 6). This rotation of the cam 618 causes the first cam follower 612 to traverse the surface of the first end 620 of the cam 618 towards the second location, and the rotation causes the second cam follower 613 to traverse the surface of the first end 620 of the cam 618 towards the second location 702. The second locations 700 and 702 are the deepest detentes of the cam and correspond to the radiotelephone 100 being in the private-mode configuration.

The spring 622 is designed to have enough compression force so that as the user opens the radiotelephone 100 enough to move the first cam follower 612 beyond the peak 720 and the second cam follower 613 beyond the peak 721, the spring 622 forces the first cam follower 612 to move all the way over to the second location 700 and the second cam follower 613 all the way over to the second location 700. This causes the second housing element 204 to substantially snap-open to the private-mode configuration.

Moving the second housing element 204 from the private-mode position to the second position (speakerphone position) causes the cam to rotate in a clockwise direction around the axis 697. The first cam follower 612 will traverse the first end 620 of the cam 618 to the third location 708, and the second cam follower 613 traverses the first end 620 to the third location 710.

The spring 622 is designed to have enough compression force so that if the user brings the radiotelephone 100 to his ear while the radiotelephone 100 is open to the speakerphone position and operating in the speakerphone mode, a small amount of contact between the second housing element 204 and the user (e.g. the user's ear or head) will cause the second housing element 204 to snap back to the private mode position. This will automatically place the radiotelephone 100 into the private mode of operation and thereby protect the user's ear from acoustic shock. The hinge assembly can be designed so that a force in the range of substantially 0.5 Newtons to 1.0 Newtons of force will cause the second housing element 204 to snap to the private mode configuration.

From the speakerphone configuration, closing the second housing element 204 relative to the first housing element 202 causes the cam 618 to rotate clockwise about the axis 697. The first cam follower 612 will move to the first position 704, and the second cam follower 613 will move to the first position 706.

Figure 7:
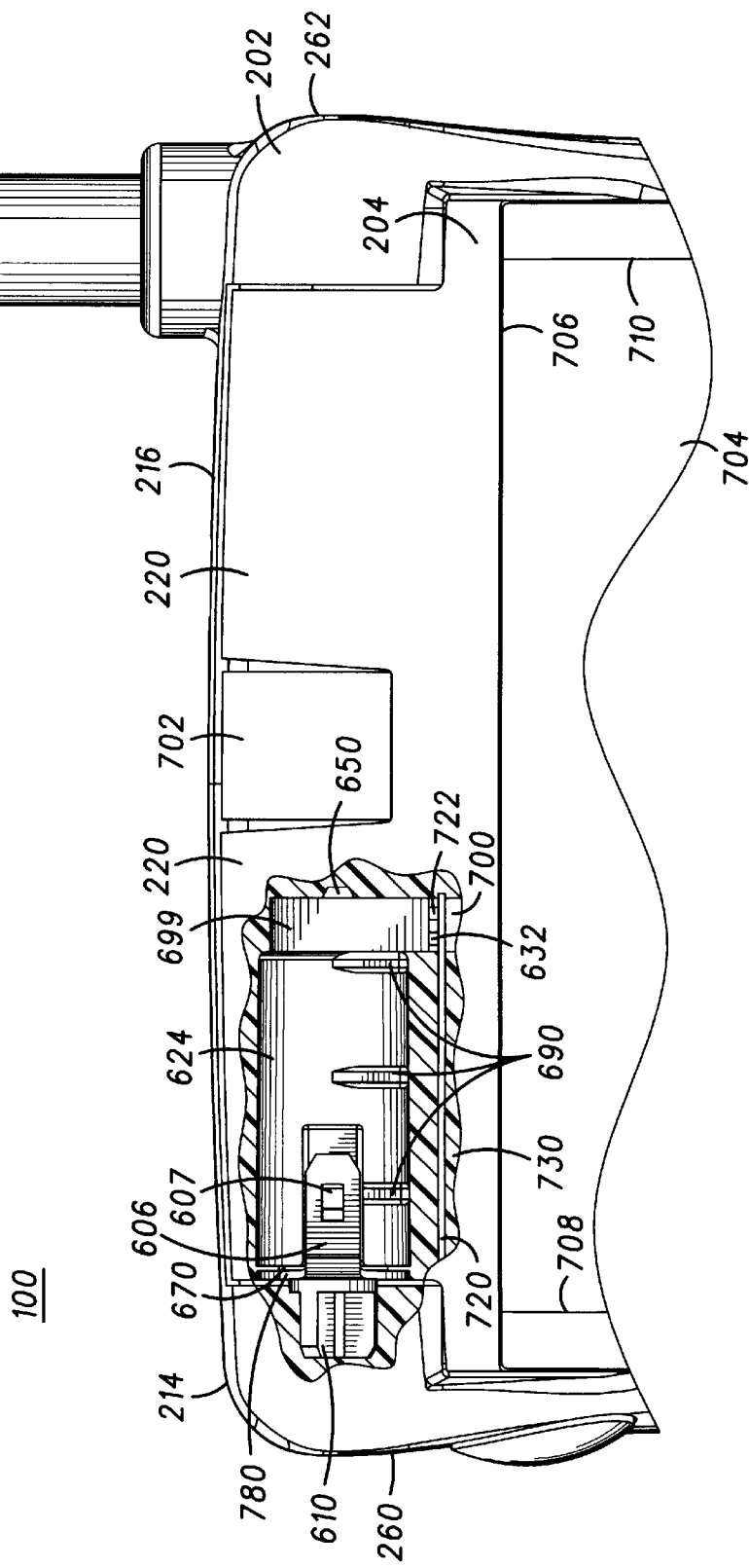
FIG. 7 is a portion of the top view of the portable communication device in the closed position; a cutaway view shows a portion of the first hinge assembly.

FIG. 7 is a portion of the top view of the portable communication device 100 in the closed position; a cutaway view shows a portion of the first hinge assembly 214. The first housing element 202 is movably connected to the second housing element 204 through the hinge 220. Three portions of the first housing element 202 couple to the hinge 220. The first portion 260 of the first housing element 202 couples to the first end 610 of the shaft 650. The second portion 262 of the first housing element 202 couples to the second hinge assembly 216. A third portion 702 of the first housing element 202 couples to the first hinge assembly 214 and the second hinge assembly 216.

A portion of the top of the second housing element 204 is formed to have a recessed area 704 for receiving the battery 233. The recessed area 704 has a first side wall 708, a second side wall 710, a third side wall 706, and a fourth side wall (not shown) located opposite the third side wall 706.

The second housing element 204 is formed by injection molding to have an opening 780 for receiving the first hinge assembly 214. The second housing element 204 is formed to have another opening 700 for inserting the switch 699. The flexible circuit 720 rests against the portion 730 of the third side wall 706, and the four electrical contacts (two shown in FIG. 7 as 632 and 722) of the switch 699 contact the flexible circuit 720.

The insert can 624 abuts the switch 699, and the shaft 650 is shown to engage the switch 699. The first tab 607 of the first prong 606 is shown coupled to the a first opening 626 on the first side 627 of the insert can 624. The cam 618 and the spring 622 are disposed within the insert can 624.

Thus, the second housing element 204 is formed to have a hollow section 732 for housing the hinge assembly of the first hinge 214. The cap 602 is shown to limit the progression of the first end 610 of the shaft 650 through the opening 604 of the cap 602. The first end 610 of the shaft 650 couples to the first portion 260 of the first housing element 202.

It is possible for external contaminants, such as metal fragments or water, to cause a malfunction in the switch 699. In addition, it is possible for the switch 699 itself to malfunction. To further protect the user from placing the radiotelephone 100 close to his ear when the radiotelephone 100 improperly operates in the speakerphone mode as a result of external contaminants or switch 699 malfunction, circuitry is used to make the switch 699 more robust. The switch 699 thus comprises circuitry for producing the position signal.

Figure 8:
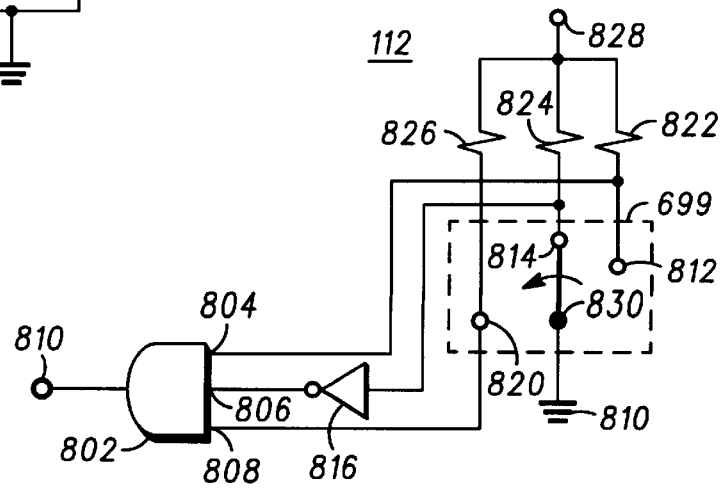
FIG. 8 is a partial schematic and part symbol representation of a sensor comprising a switch and circuitry.

FIG. 8 is a partial schematic and part symbol representation of the sensor 112 comprising a switch 699 and circuitry. An AND gate 802 has a first port 804, a second port 806, a third port 808, and an output port 810. The first input port 804 is coupled to a first terminal 812 of the switch 699, the second input port 806 is coupled through an inverter 816 to a second terminal 814 of the switch 699, and the third input port 808 is coupled to a third terminal 820 of the switch 699. In addition, a first resistor 822 couples the first input port 812 to a supply voltage terminal 828, a second resistor 824 couples the second input port 814 to the supply voltage terminal 828, and a third resistor 826 couples the third input port 820 to the supply voltage 828 terminal.

As the second housing element 204 is moved from one position to another relative to the first housing element 202, the pole 830 of the switch 699 couples one of the three switch terminals to ground the ground terminal 810. When the second housing element is in the closed position (FIG. 4), the switch 699 couples the third terminal 820 and the third input 808 of the AND gate 802 to the ground terminal 810. The output 810 of the AND gate 802 produces a position signal that is asserted low; this corresponds to the standby mode.

When the second housing element 204 is set to the private-mode position (FIG. 2), the switch 699 couples the first terminal 812 and the first input port 804 to the ground terminal 810. The output 810 of the AND gate 802 produces a position signal that is asserted low; the radiotelephone 100 operates in the private-mode.

When the second housing element 204 is set to the speakerphone position (FIG. 3), the switch 699 couples the second terminal 814 to the ground terminal 810. The inverter 816 causes the signal input to the second input port 806 to be asserted high. The signal at the first input port 804 is asserted high since the first resistor 822 couples the supply voltage terminal 828 to the first input port 804. The signal at the third input port 808 is asserted high since the third resistor 826 couples the supply voltage terminal 828 to the third input port 808. Therefore, the output 810 of the AND gate 802 produces a position signal that is asserted high. When the controller 106 then senses the presence of the activation signal, the radiotelephone will operate in the speakerphone mode.

If contaminants cause the second terminal 814 and the third terminal 820 of the switch 699 to short together, the radiotelephone 100 will operate in the private-mode. For example, if the second housing element 204 is in the speakerphone position, the switch 699 couples the second terminal 814 to the ground terminal 810. The inverter 816 causes the signal input to the second input port 806 to be asserted high. The signal at the first input port 804 is asserted high since the first resistor 822 couples the supply voltage terminal 828 to the first input port 804. However, since the third terminal 820 is shorted to the second terminal 814, the input signal to the third input port 808 will be asserted low, resulting in the position signal produced at the output 810 to be asserted low. The radiotelephone will thus safely operate in the private-mode. The circuitry coupled to the switch 699 will cause the radiotelephone 100 to operate in the private-mode when other types of contaminant-related shorts are present. In addition, if the switch malfunctions or is in an intermediate position wherein it does not make contact with any of the first terminal 812, the second terminal 814, or the third terminal 820, the input signal to the second input port 806 will be asserted low since it is coupled through the inverter 816 to the supply voltage terminal 828.

Figure 9:
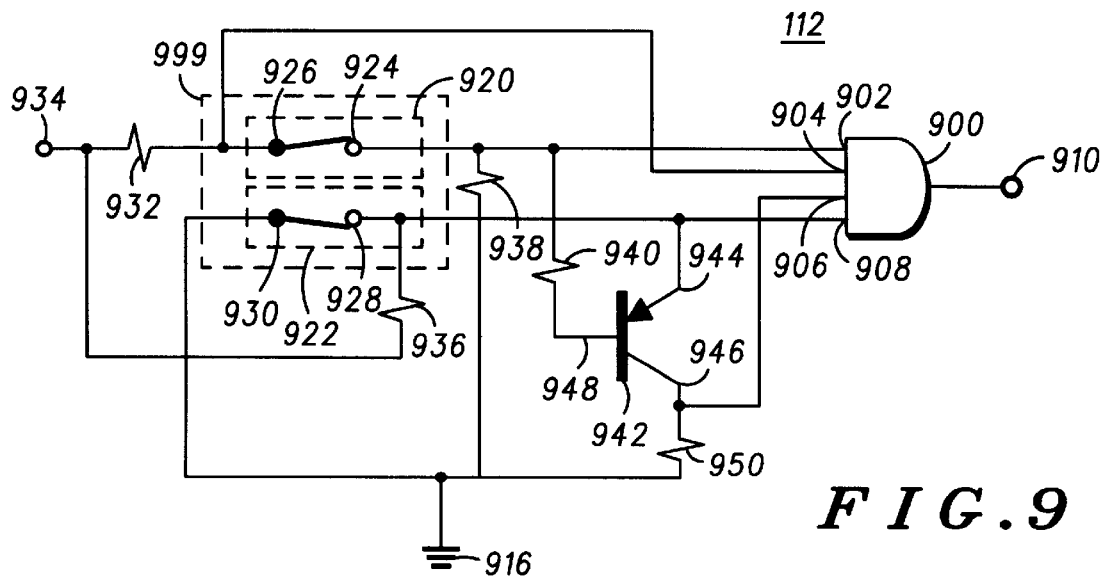
FIG. 9 is an alternate embodiment of the sensor in accordance with the present invention.

FIG. 9 is an alternate embodiment of the sensor 112 in accordance with the present invention. The sensor 112 comprises two switches, first switch 920 and second switch 922, disposed in a single package 999.

An AND gate 900 comprises a first input port 902, a second input port 904, a third input port 906, a fourth input port 908, and an output port 910. The first input port 902 is coupled to a first terminal 924 of the first switch 920, the second input port 904 is coupled to a second terminal 926 of the first switch 920, the third terminal 906 is coupled through a first resistor 950 to a ground terminal 916, and the fourth input port 908 is coupled to the first terminal 928 of the second switch 922. The second terminal 930 of the second switch 922 is coupled to the ground terminal 916.

A second resistor 932 couples the second terminal 926 of the first switch to a supply voltage terminal 934, and a third resistor 938 couples the first terminal 924 of the first switch 920 to the ground terminal 916. A fourth resistor 936 couples the first terminal 928 of the second switch 922 to the supply voltage terminal 934.

In addition the circuitry comprises a PNP bipolar transistor comprising an emitter 944, a base 948, and a collector 946. The collector 946 is coupled to the first resistor 950, the emitter 944 is coupled to the fourth input port 908 of the AND gate 900, and a fifth resistor 940 couples the base 948 to the first input port 902 of the AND gate 900.

When the second housing element 204 is in the closed position (FIG. 4), the first switch 920 is closed (the first terminal 924 is coupled to the second terminal 926) and the second switch 922 is closed (the first terminal 928 is coupled to the second terminal 930). Since the second switch 922 is closed, the fourth input 908 is coupled through the second switch 922 to the ground terminal 916, and the position signal produced at the output 910 is asserted low. The radiotelephone 100 operates in the standby mode.

When the second housing element 204 is set to the private-mode position (FIG. 2), the first switch 920 is open (the first terminal 924 is not coupled to the second terminal 926), and the second switch is closed. The first input 902 is coupled through the third resistor 938 to the ground terminal, and the fourth terminal 908 is coupled through the second switch 922 to the ground terminal 916. The position signal produced at the output 910 is thus asserted low, and the radiotelephone 100 operates in the private-mode.

When the second housing element 204 is set to the speakerphone position (FIG. 3), the first switch is closed and the second switch is open. The first input port 902 is coupled through the first switch 920 and the second resistor 932 to the supply voltage terminal 934. The second input port 904 is coupled through the second resistor 932 to the supply voltage terminal 934. The fourth input port 908 is coupled through the fourth resistor 936 to the supply voltage terminal 934. In this configuration, the second resistor 932 and the third resistor 938 form a voltage divider network, such that the voltage at the base 948 is substantially the supply voltage minus 0.7 volts. Since the emitter 944 is coupled to the supply voltage terminal 934, the PNP transistor is turned on, and the collector current produces a voltage drop across the first resistor 950. The voltage drop corresponds to an asserted high input signal a the third input port 906. Thus, all of the input signals are asserted high, and the position signal produced at the output 910 is asserted high, thereby causing the radiotelephone 100 to operate in the speakerphone mode.

If the second housing element 204 is in an intermediate mode position, meaning it is in a position that is in between the closed position and the speakerphone position or in between the speakerphone position and the private-mode position, both the first switch 920 and the second switch 922 are opened. In this intermediate configuration, the input signals to the first input port 902 and the third input port 906 are asserted low, thus producing a position signal that is asserted low. The radiotelephone 100 will thus operate in the private-mode.

The circuitry provides protection against contaminants and switch malfunction. In addition, the PNP bipolar transistor 946 provides extra protection in the event that the first input port 904, the second input port 904, and the third input port 908 are shorted together. In that instance, the voltage applied to the base 948 and the emitter 944 are substantially equal, so the PNP bipolar transistor 946 will shut substantially off. No collector current will be present to produce a voltage drop across the first resistor 950 that is sufficient to produce an asserted high signal to the third input port 906, so that the position signal will be asserted low. The radiotelephone 100 will operate in the private-mode.

Figure 10:
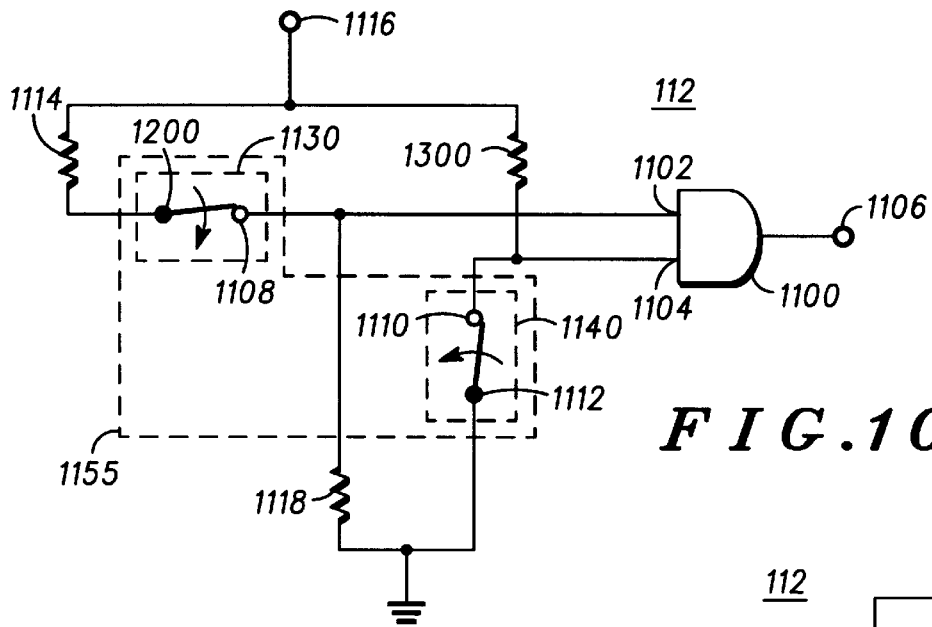
FIG. 10 is another alternate embodiment of the sensor in accordance with the present invention.

FIG. 10 is another alternate embodiment of the sensor 112. The sensor 112 comprises two switches, first switch 1130 and second switch 1140, disposed in a single package 1155. An AND gate 1100 has a first input 1102, a second input 1104, and an output 1106. The first input port 1102 is coupled to a first terminal 1108 of the first switch 1130 and the second input port 1104 is coupled to a first terminal 1110 of the second switch 1140. The second switch 1140 has a second terminal 1112 that is coupled to a ground terminal 1120. A first resistor 1114 couples the second terminal 1200 of the first switch 1130 to a supply voltage terminal 1116. A second resistor 1118 couples the first input port 1102 to the ground terminal 1120. A third resistor 1300 couples the second input port 1104 to the supply voltage terminal 1116.

When the second housing element 204 is in the closed position, the first switch 1130 is closed and the second switch 1140 is closed. The second input port 1104 is coupled to the ground terminal 1120, so the position signal produced at the output 1106 is asserted low. The radiotelephone 100 thus operates in the standby mode.

When the second housing element is set to the private-mode position, the first switch 1130 is open and the second switch 1140 is closed. The first input port 1102 is coupled through the second resistor 1118 to the ground terminal 1120, and the second input port 1104 is coupled through the second switch 1140 to the ground terminal 1120. The position signal produced at the output 1106 is thus asserted low, and the radiotelephone 100 operates in the private-mode.

When the second housing element 204 is set to the speakerphone position, the first switch 1130 is closed and the second switch 1140 is open. The first resistor 1114 and the second resistor 1118 forms a voltage divider network that couples an asserted high voltage to the first input port 1102. The second input port 1104 is coupled through the third resistor 1300 to the supply voltage terminal 1116. The position signal produced at the output 1106 is thus asserted high, and the radiotelephone 100 operates in the speakerphone mode.

If the second housing element 204 is in an intermediate mode position, meaning it is in a position that is in between the closed position and the speakerphone position or in between the speakerphone position and the private-mode position, both the first switch 1130 and the second switch 1140 are opened. In this intermediate configuration, the input signal to the first input port 1102 is asserted low, thus producing a position signal that is asserted low. The radiotelephone 100 will thus operate in the private-mode.

Figure 11:
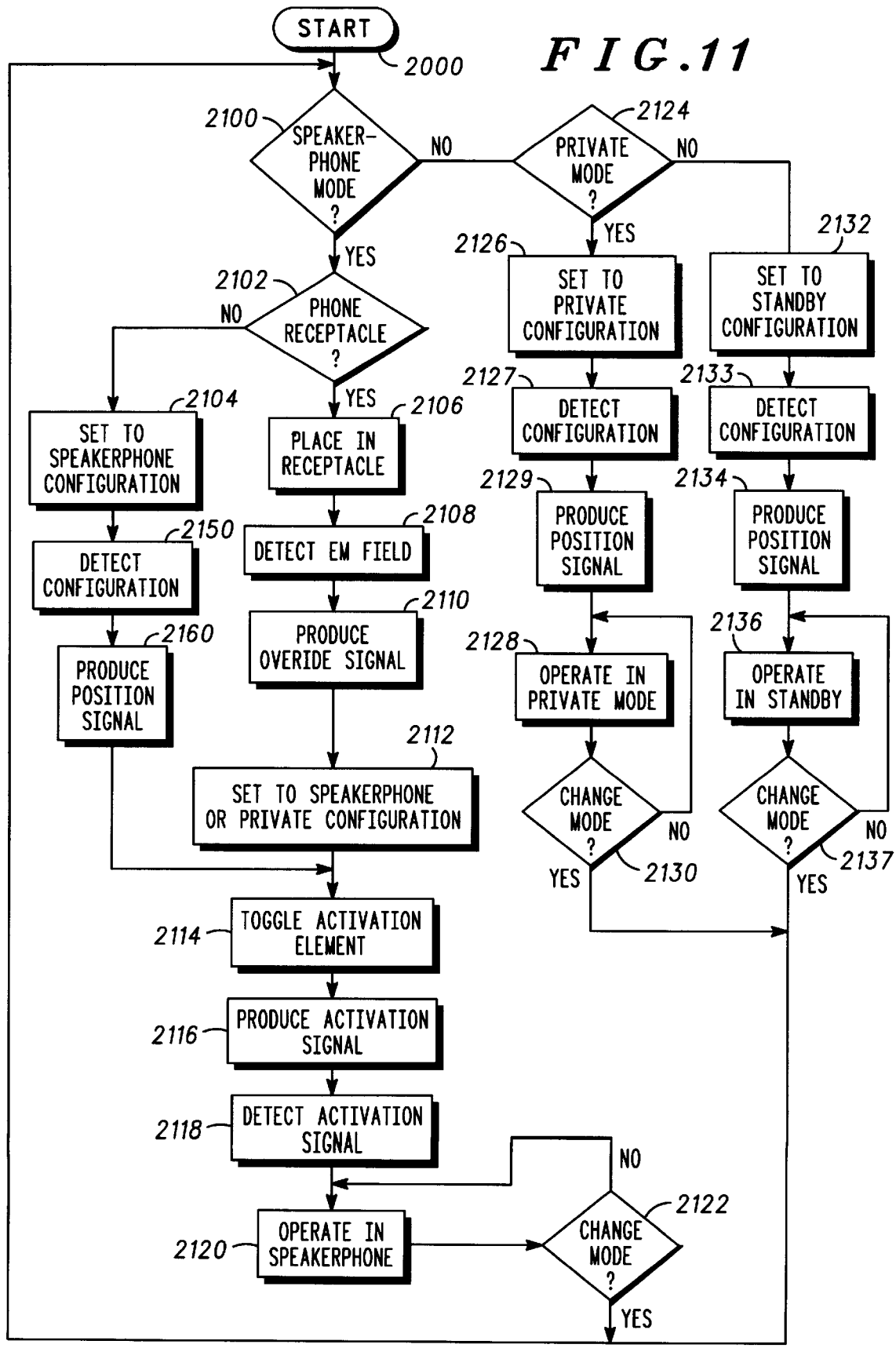
FIG. 11 is a flow chart illustrating a method of mode-switching in the portable communication device.

FIG. 11 is a flow chart illustrating a method of mode-switching in the radiotelephone 100. The method starts at block 2000, and at decision block 2100 it is determined if the user desires to operate the radiotelephone 100 in the speakerphone mode. If the user does not desire speakerphone operation, it is determined at decision block 2124 if the user desires to operate the radiotelephone 100 in the private-mode. If private-mode operation is not desired, the user sets the position of the second housing element 204 to the standby position at block 2132. The sensor 112 detects the configuration at block 2133 and produces a position signal at block 2134. The controller 106 then operates the radiotelephone 100 in the standby mode at block 2136. Operation in the standby mode continues until the user decides at decision block 2137 to change the mode of operation. When the user desires to change the mode of operation, progression is made to decision block 2100.

If at block 2124 the user does desire to operate the radiotelephone 100 in the private-mode, the user sets the position of the second housing element 204 to the private-mode position at block 2126. The sensor 112 detects the position of the second housing element 204 at block 2127 and produces the position signal at block 2129. The controller 106 then operates the radiotelephone 100 in the private-mode at block 2128. Operation continues in the private-mode until the user desires at decision block 2130 to change the mode of operation. When the user desires to change the mode of operation at decision block 2130, progression is made to decision block 2100.

If the user desires to operate the radiotelephone 100 in the speakerphone mode at decision block 2100, the user then decides at decision block 2102 if it is desired to operate the radiotelephone 100 in the phone receptacle 3000. If use of the phone receptacle 3000 is not desired, the second housing element 204 is set to the speakerphone position at block 2104. The sensor 112 detects the radiotelephone configuration at block 2150 and produces a position signal at block 2160. Progression is then made to block 2114. If use of the phone receptacle 3000 is desired, the radiotelephone 100 is coupled to the phone receptacle 3000 at block 2106. The EM sensor 116 detects the presence of an EM field of a predetermined strength at block 2108 and produces an override signal at block 2110. The user then sets the radiotelephone to one of the speakerphone configuration and the private-mode configuration at block 2112, and progression is made to block 2114.

The user toggles the activation element 230 at block 2114, and an activation signal is produced at block 2116. The controller 106 detects the presence of the activation signal at block 2118 and operates the radiotelephone 100 in the speakerphone mode at block 2120. Operation continues in the speakerphone mode until the user desires to change the mode of operation at decision block 2122, wherein progression is made to decision block 2100.

Figure 12:
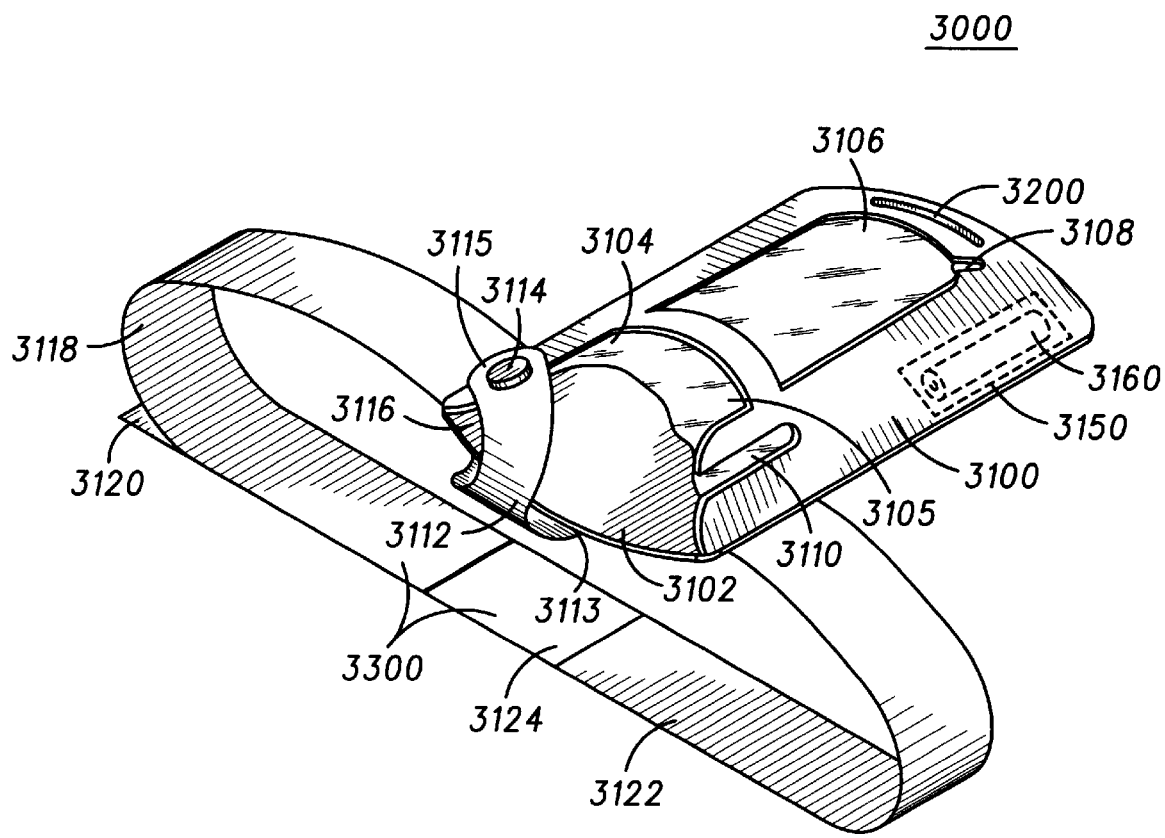
FIG. 12 illustrates a phone receptacle for coupling to the portable communication device.

FIG. 12 illustrates a phone receptacle 3000 for coupling to the radiotelephone 100. A first portion 3100 is formed to have a first opening 3102 for receiving the first housing element 202 of the radiotelephone 100. In the illustrated embodiment, the first portion comprises multiple sections of leather stitched together. It will be understood by those skilled in the art that other embodiments of the first portion 3100 are possible. For example, the first portion 3100 can comprise a single piece of molded plastic, or it could comprise a cloth or rubber material.

A second portion 3112 is coupled to the first portion 3100 at one end 3113 of the second portion 3112. The second portion 3112 has a button 3114 at another end 3115 for coupling the second portion 3112 to the first portion 3100. Coupling the second portion 3112 to the first portion 3100 forms a second opening 3116 for allowing the antenna 102 to protrude through the second opening 3116. The second portion 3112 thus forms a strap for holding the radiotelephone into the first portion 3100.

A section of transparent, malleable plastic 3104 is coupled to the first portion 3100. A section 3105 of the first opening 3102 is encompassed by the plastic 3104. The plastic 3104 thus forms a transparent protective cover for the first housing element 202 when it is inserted into the first portion 3100. The plastic 3104 is transparent so that the user can see, for example, the display 208 and the keypad 206 of the radiotelephone 100.

The first portion 3100 is formed to have a third opening 3106 so that the user can access the keypad 206 when the radiotelephone 100 is inserted into the first portion 3100. The plastic 3104 covers the third opening 3106 such that the user can see the keypad 206 and enter commands into the keypad 206 while the plastic protects the keypad from contaminants.

The first portion 3100 is formed to have a fourth opening 3108 for access to the microphone 212 of the radiotelephone. The first portion 3100 is formed to have a fifth opening 3200 for access to the external power supply receptacle 290.

An attachment device 3300, here comprising a first attachment element 3122 and a second attachment element 3118, is coupled to the first portion 3100. The first attachment element 3122 comprises a flexible strap with a first section of coupling material 3124. The second attachment element 3118 comprises a flexible strap with a second section of coupling material 3120. The first attachment element 3122 and the second attachment element 3118 are for attaching the phone receptacle to a substantially stationary object. For example, the first attachment element 3122 and the second attachment element 3118 can be wrapped around an automobile visor, with the first section of coupling material 3124 fastened to the second section of coupling material 3120. The first portion 3100 is formed to have a pocked 3150 for carrying a magnet 3160.

In an alternate embodiment, the first portion 3100 comprises a piece of molded plastic formed to receive the first housing element 202 of the radiotelephone 100. The first portion 3100 is formed to have a first ridge and a second ridge for coupling to the radiotelephone 100. In addition, the first portion is formed to have a coupling element for firmly attaching the radiotelephone 100 to the first portion 3100. For example, the coupling element can comprise a clip.

The attachment device 3300 is movably coupled to the first portion 3100 such that the first portion 3100 is rotatable about the attachment device 3300. For example, the attachment device 3300 can comprise a plastic clip.

The first portion 3100 is formed to carry a magnet. The magnet can also be disposed on the attachment device 3300, or it can form part of the assembly of the attachment device 3300. The phone receptacle 3000 can then be attached to another object, such as the visor of an automobile, a user's belt, or a portion of the user's clothing material, through the use of the attachment device 3300. The attachment device 3300 can also comprise a strap configuration as described in FIG. 12.

In another alternate embodiment, the first portion 3100 is formed of a single piece of molded plastic, and the first portion 3100 is formed to have multiple ridges for coupling to the radiotelephone 100. The first portion 3100 is also formed to have a coupling element comprising a first coupling element and a second coupling element. The first coupling element 3122 is formed to engage the first portion 260 of the first housing element 202. The second coupling element 3118 is formed to engage the second portion 262 of the first housing element 202. The attachment device 3300 can comprise a clip that is movably coupled to the first portion 3100, or the attachment device can comprise the strap configuration as described in FIG. 12.

A mode-switchable radiotelephone in accordance with the present invention has a significant advantage over a conventional radiotelephone. Setting the second housing element to a specific, speakerphone position prevents the user from placing the radiotelephone close to the user's ear when the radiotelephone is in the speakerphone position. Thus, the likelihood of accidental acoustic shock is greatly reduced. In addition, by requiring the user to initiate an activation element in addition to putting the radiotelephone in the speakerphone position, the likelihood of accidental acoustic shock is further reduced.

The previous description of the preferred embodiments are provided to enable any person skilled in the art to make or use the mode-switchable radiotelephone. Various modifications to these embodiments will be readily apparent to those skilled in the art, and the generic principles defined herein may be applied to other embodiments without the use of the inventive faculty. For example, the second housing element can comprise a boom mike or a slidable section.

What is claimed is:

1. A portable communication device comprising:
   a first housing element;
   a second housing element that is movably connected to the first housing element, the second housing element settable to substantially three positions;
   a sensor coupled to the first housing element and the second housing element for detecting a position of the second housing element relative to the first housing element and producing a position signal; and
   a controller for operating the portable communication device in one of a standby mode, a speakerphone mode, and a private-mode in response to the position signal, wherein the controller operates the portable communication device in the speakerphone mode when the position signal indicates that the second housing element is in a speakerphone position and the controller detects an activation signal.

2. The portable communication device as in claim 1, further comprising an activation element disposed on one of the first housing element and the second housing element, the activation element producing the activation signal in response to a user input, wherein the controller operates the portable communication device in the speakerphone mode when the controller detects the activation signal.

3. The portable communication device as in claim 1, wherein the sensor comprises a switch.

4. The portable communication device as in claim 3, wherein the sensor further comprises circuitry coupled to the switch for producing the position signal.

5. A portable communication device comprising:
   a first housing element;
   a second housing element that is movably connected to the first housing element, the second housing element settable to substantially three positions;
   a sensor coupled to the first housing element and the second housing element for detecting a position of the second housing element relative to the first housing element and producing a position signal;
   a controller for operating the portable communication device in one of a standby mode, a speakerphone mode, and a private-mode in response to the position signal
   an activation element disposed on one of the first housing element and the second housing element, the activation element producing an activation signal in response to a user input,, wherein the controller operates the portable communication device in the speakerphone mode when the position signal indicates that the second housing element is in a speakerphone position and the controller detects the activation signal.

6. The portable communication device as in claim 5, wherein the speakerphone position comprises the second housing element opened to a predetermined position within a range of seventy degrees and one-hundred-ten degrees relative to the first housing element.

7. The portable communication device as in claim 6, wherein the portable communication device operates in the standby mode when the second housing element is set to a substantially closed position relative to the first housing element, and the portable communication device operates in the private-mode when the second housing element is set to a private-mode position relative to the first housing element.

8. The portable communication device as in claim 7, wherein the private-mode position comprises the second housing element set to a predetermined position within a range of one-hundred-thirty degrees and one-hundred-eighty degrees relative to the first housing element.

9. The portable communication device as in claim 5, wherein the sensor comprises a first switch and a second switch disposed in a single package.

10. The portable communication device as in claim 9, wherein the sensor further comprises circuitry coupled to the first switch and the second switch for producing the position signal.

11. The portable communication device as in claim 10, wherein the circuitry further comprises:
    an AND gate having a first input port, a second input port, and an output port, the first input port of the AND gate coupled to a first terminal of the first switch, the second input port of the AND gate coupled to a first terminal of the second switch, and the second switch having a second terminal coupled to a ground potential;
    a first resistor that couples a second terminal of the first switch to a supply voltage;
    a second resistor that couples the first input port of the AND gate to the ground potential;
    a third resistor that couples the second input port of the AND gate to the supply voltage; and
    wherein the position signal is produced at the output port of the AND gate.

12. The portable communication device as in claim 10, wherein the circuitry further comprises:
    an AND gate having a first input port, a second input port, a third input port, a fourth input port, and an output port, the first input port of the AND gate coupled to a first terminal of the first switch, the second input port of the AND gate coupled to a second terminal of the first switch, the third input port of the AND gate coupled through a first resistor to a ground potential, the fourth input port of the AND gate coupled to the first terminal of the second switch, and the second terminal of the second switch coupled to the ground potential;
    a second resistor that couples the second terminal of the first switch to a supply voltage;
    a third resistor that couples the first terminal of the first switch to the ground potential;
    a fourth resistor that couples the first terminal of the second switch to the supply voltage;
    a PNP transistor having an emitter, a base, and a collector, the collector coupled to the first resistor, the emitter coupled to the fourth input port of the AND gate;

a fifth resistor that couples the base of the PNP transistor to the first input port of the AND gate; and wherein the position signal is produced at the output port of the AND gate.

13. A portable communication device comprising:

a first housing element;

a second housing element that is movably connected to the first housing element, the second housing element settable to substantially three positions;

a sensor coupled to the first housing element and the second housing element for detecting a position of the second housing element relative to the first housing element and producing a position signal;

a controller for operating the portable communication device in one of a standby mode, a speakerphone mode, and a private-mode in response to the position signal; and an activation element disposed on one of the first housing element and the second housing element, the activation element producing an activation signal in response to a user input, wherein the controller operates the portable communication device in the speakerphone mode when the controller detects the activation signal; and an electromagnetic (EM) sensor positioned in the first housing element, the EM sensor producing an override signal in response to sensing an EM field of a predetermined strength, wherein the controller will operate the portable communication device in the speakerphone mode when the controller detects the override signal and the activation signal.

14. The portable communication device as in claim 13, wherein a gain of a high frequency audio response of the portable communication device is increased when the controller detects the override signal and the activation signal and operates the portable communication device in the speakerphone mode.

15. The portable communication device as in claim 13, further comprising a phone receptacle formed to receive the portable communication device, the phone receptacle having a magnet for producing the EM field.

16. The portable communication device as in claim 15, wherein the phone receptacle comprises a first portion coupled to an attachment device, the first portion formed to receive the portable communication device, the attachment device formed to couple to a substantially stationary object.

17. A portable communication device comprising:

a first housing element;

a second housing element that is movably connected to the first housing element, the second housing element settable to substantially three positions;

a sensor coupled to the first housing element and the second housing element for detecting a position of the second housing element relative to the first housing element and producing a position signal; and a controller for operating the portable communication device in one of a standby mode, a speakerphone mode, and a private-mode in response to the position signal, wherein the portable communication device operates in the standby mode when the second housing element is set to a substantially closed position relative to the first housing element, the portable communication device operates in the speakerphone mode when the second housing element is set to a substantially ninety-degree position relative to the first housing element, and the portable communication device operates in the private-mode when the second housing element is set to a private-mode position relative to the first housing element.

18. The portable communication device as in claim 17, wherein the private-mode position comprises the second housing element set to a predetermined position within a range of one-hundred-thirty degrees and one-hundred-eighty degrees relative to the first housing element.

19. A portable communication device comprising:

a first housing element;

a second housing element that is movably connected to the first housing element the second housing element settable to substantially three positions;

a sensor coupled to the first housing element and the second housing element for detecting a position of the second housing element relative to the first housing element and producing a position signal, wherein the sensor comprises a switch and circuitry coupled to the switch for producing the position signal and, wherein the circuitry further comprises:

an AND gate having a first input port, a second input port, a third input port, and an output port, the first input port of the AND gate coupled to a first terminal of the switch, the second input port of the AND gate coupled through an inverter to a second terminal of the switch, and the third input port of the AND gate coupled to a third terminal of the switch;

a first resistor that couples the first input port to a supply voltage;

a second resistor that couples the second input port to the supply voltage;

a third resistor that couples the third input port to the supply voltage; and wherein the position signal is produced at the output port of the AND gate; and a controller for operating the portable communication device in one of a standby mode, a speakerphone mode, and a private-mode in response to the position signal.

20. A radiotelephone having a first housing element and a second housing element that is settable to substantially three positions relative to the first housing element, the radiotelephone operating in a normal mode when the second housing element is in a first position, the radiotelephone operating in a speakerphone mode when the second housing element is in a second position, and the radiotelephone operating in a standby mode when the second housing element is in a third position, wherein the radiotelephone operates in the speakerphone mode when the second housing element is in one of the first position and the second position and an EM field of a predetermined strength is sensed.

21. The radiotelephone as in claim 20, further comprising an activation element positioned on one of the first housing element and the second housing element, the radiotelephone operating in the speakerphone mode when the second housing element is in the second position and the activation element is toggled by a user.

22. The radiotelephone as in claim 20, wherein the first housing element and the second housing element are movably connected by a hinge.

23. The radiotelephone as in claim 22, wherein the hinge comprises a hinge assembly, wherein a force applied to the second housing element substantially within a range of 0.5 Newtons to 1.0 Newtons will cause the second housing element 204 to move from the second position to the first position.

24. The radiotelephone as in claim 22, further comprising a sensor coupled to the hinge, the sensor for detecting a position of the second housing element relative to the first housing element.

25. A radiotelephone having a first housing element and a second housing element that is settable to substantially three positions relative to the first housing element, the radiotelephone operating in a normal mode when the second housing element is in a first position, the radiotelephone operating in a speakerphone mode when the second housing element is in a second position, and the radiotelephone operating in a standby mode when the second housing element is in a third position; and further comprising an electromagnetic (EM) sensor positioned in one of the first housing element and the second housing element, wherein the radiotelephone operates in the speakerphone mode when the second housing element is in the first position and the EM sensor senses an EM field of a predetermined strength, and the radiotelephone operates in the speakerphone mode when the second housing element is in the second position and the EM sensor senses an EM field of a predetermined strength.

26. The radiotelephone as in claim 25, wherein a gain of a high frequency audio response of the radiotelephone is increased when the radiotelephone operates in the speakerphone mode and the EM sensor senses an EM field of a predetermined strength.

27. A radiotelephone comprising:
a first housing element;
a second housing element that is movably connected to the first housing element by a hinge, the second housing element settable to substantially three positions;
a sensor coupled to the hinge for detecting a position of the second housing element relative to the first housing element and producing a position signal;
an activation element disposed on one of the first housing element and the second housing element, the activation element producing an activation signal in response to a user input; and
a controller for operating the radiotelephone in a private-mode when the position signal indicates that the second housing element is in a substantially first position relative to the first housing element, operating the radiotelephone in a speakerphone mode when the position signal indicates that the second housing element is in a substantially second position relative to the first housing element and an activation signal is present, and operating the radiotelephone in a standby mode when the position signal indicates that the first housing element and the second housing element are in a substantially closed position.

28. The radiotelephone as in claim 27, wherein the hinge comprises a hinge assembly.

29. The radiotelephone as in claim 28, wherein the sensor further comprises:
a switch that is selectively activated by interaction with the hinge assembly; and
a circuit coupled to the switch for producing the position signal.

30. The radiotelephone as in claim 29, wherein the activation element comprises a button.

31. A method for mode-switching in a radiotelephone comprising the steps of:
setting a second housing element of the radiotelephone to a predetermined position relative to a first housing element of the radiotelephone;
sensing a position of the second housing element relative to the first housing element;
producing a position signal;
detecting an activation signal; and
operating the radiotelephone in a speakerphone mode in response to the position signal and the activation signal.

32. A method for mode-switching in a radiotelephone comprising the steps of:
setting a second housing element of the radiotelephone to a predetermined position relative to a first housing element of the radiotelephone;
sensing a position of the second housing element relative to the first housing element;
producing a position signal;
operating the radiotelephone in a speakerphone mode in response to the position signal;
toggling an activation element;
producing an activation signal; and
wherein the operating of the radiotelephone in the speakerphone mode is in response to the position signal and the activation signal.

33. The method for mode-switching in a radiotelephone as in claim 32, wherein setting the second housing element of the radiotelephone comprises setting the second housing element to a predetermined position within a range of seventy degrees and one-hundred-ten degrees relative to the first housing element for operation in the speakerphone mode.

34. The method for mode-switching in a radiotelephone as in claim 33, further comprising the steps of:
setting the first housing element to a predetermined position within a range of one-hundred-thirty degrees and one-hundred-eighty degrees relative to the first housing element; and
operating the radiotelephone in a private-mode in response to the position signal.

35. The method for mode-switching in a radiotelephone as in claim 34, further comprising the steps of:
setting the first housing element to a substantially closed position relative to the first housing element; and
operating the radiotelephone in a standby mode in response to the position signal.

36. A method for operating a radiotelephone comprising the steps of:
setting a second housing element to one of three positions relative to a first housing element;
sensing a position of the second housing element relative to a first housing element;
producing a position signal in response to the position of the second housing element relative to the first housing element;
checking for an activation signal; and
operating the radiotelephone in a standby mode when the position signal indicates that the radiotelephone is in a closed configuration, operating the radiotelephone in a private-mode when the position signal indicates that the radiotelephone is in a private-mode configuration, and operating the radiotelephone in a speakerphone mode when the position signal indicates that the radiotelephone is in a speakerphone configuration and the activation signal is present.

37. The method for operating a radiotelephone as in claim 36, further comprising the step of toggling an activation element to produce an activation signal when a user desires to operate the radiotelephone in the speakerphone mode.

38. The method for operating a radiotelephone as in claim 36, further comprising the steps of:

setting the position of the radiotelephone to one of the private-mode configuration and the speakerphone configuration;

detecting an electromagnetic (EM) field of a predetermined strength;

producing an override signal;

detecting the override signal;

toggling an activation element to produce an activation signal;

detecting the activation signal; and operating the radiotelephone in a speakerphone mode in response to the position signal and the activation signal.

* * * * *